United States Patent
Na

(10) Patent No.: US 10,570,848 B2
(45) Date of Patent: Feb. 25, 2020

(54) METHOD FOR DIAGNOSING PCSV

(71) Applicants: Hyundai Motor Company, Seoul (KR); Kia Motors Corporation, Seoul (KR)

(72) Inventor: Jung-Wook Na, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 15/837,837

(22) Filed: Dec. 11, 2017

(65) Prior Publication Data

US 2018/0313289 A1 Nov. 1, 2018

(30) Foreign Application Priority Data

Apr. 27, 2017 (KR) .......................... 10-2017-0054355

(51) Int. Cl.
*F02D 41/22* (2006.01)
*F02M 25/08* (2006.01)
*F02D 41/00* (2006.01)
*G01M 3/32* (2006.01)

(52) U.S. Cl.
CPC ......... *F02D 41/221* (2013.01); *F02D 41/004* (2013.01); *F02M 25/0818* (2013.01); *F02D 2041/225* (2013.01); *G01M 3/3236* (2013.01)

(58) Field of Classification Search
CPC ................. F02D 41/221; F02D 41/004; F02D 2041/225; F02M 25/0818; G01M 3/3236
See application file for complete search history.

(56) References Cited

U.S. PATENT DOCUMENTS

| | | | |
|---|---|---|---|
| 6,968,732 B2 | 11/2005 | Nakoji | |
| 7,506,639 B2 * | 3/2009 | Saito | F02M 25/0827 123/518 |
| 7,810,475 B2 * | 10/2010 | Peters | F02M 25/089 123/519 |
| 9,255,553 B2 * | 2/2016 | Dudar | F02M 25/0809 |
| 9,353,707 B2 * | 5/2016 | Kimura | F02M 25/0809 |
| 9,416,755 B2 * | 8/2016 | Dudar | F02M 25/0809 |
| 9,759,168 B2 * | 9/2017 | Pursifull | F02M 25/089 |
| 9,932,937 B2 * | 4/2018 | Jentz | F02M 25/0809 |
| 2014/0130781 A1 * | 5/2014 | Jentz | F02M 25/0809 123/520 |
| 2019/0186423 A1 * | 6/2019 | Choi | F02M 25/0827 |

FOREIGN PATENT DOCUMENTS

| | | |
|---|---|---|
| JP | 2005-061264 A | 3/2005 |
| KR | 10-0756861 B1 | 8/2007 |
| KR | 10-2008-0000036 A | 1/2008 |
| KR | 10-1279732 B1 | 6/2013 |

* cited by examiner

*Primary Examiner* — Freddie Kirkland, III
(74) *Attorney, Agent, or Firm* — Morgan, Lewis & Bockius LLP

(57) ABSTRACT

A method for diagnosing a purge control solenoid valve (PCSV) may include forming a negative pressure in a fuel tank, checking a pressure in the fuel tank and determining whether a target negative pressure is generated, when the target negative pressure is determined not to be formed based on a result of the determining whether the target negative pressure is generated, suspecting a stuck of the PCSV that electrically controls an inflow amount of evaporated gas from the fuel tank to an intake system of an engine, and increasing a purge amount of the PCSV.

8 Claims, 7 Drawing Sheets

METHOD FOR DIAGNOSING PCSV

CROSS-REFERENCE(S) TO RELATED APPLICATIONS

The present application claims priority to Korean Patent Application No. 10-2017-0054355, filed on Apr. 27, 2017, the entire contents of which is incorporated herein for all purposes by this reference.

BACKGROUND OF THE INVENTION

Field of the Invention

The present invention relates to a method for diagnosing a purge control solenoid valve (PCSV) which controls an inflow amount of evaporated gas between an intake system of an engine and a canister.

Description of Related Art

An internal combustion engine using gasoline fuel generates evaporated gas due to the nature of the gasoline fuel, and this evaporated gas is mostly composed of a hydrocarbon (HC) component which is a component of harmful gas. Therefore, when the evaporated gas is released into the atmosphere, it may become a main cause of environmental pollution such that each country regulates by law such evaporated HC gas.

In the related art, the evaporated HC gas is suctioned into a suction absorber and then flows back into an engine to be recirculated for use as fuel, and a purge control solenoid valve (PCSV) is provided between an intake system of the engine and a canister which is a component of a fuel tank to electrically control an inflow amount of the evaporated HC gas when the evaporated HC gas flows in due to a negative pressure in the engine.

An electronic control unit (ECU) of the engine controls an evaporated HC gas recirculation device to recirculate the evaporated HC gas as long as there is no burden on the engine operation, and the PCSV plays an important role in an engine control system during collecting the evaporated HC gas at a canister, which is generated due to fuel evaporation to flow out from the fuel tank which is sealed, and then recirculating the collected evaporated HC gas, and thus an on-board diagnostic (OBD) regulation enforces to perform a diagnosis on a failure or a stuck of the PCSV. When a disconnection or a short circuit occurs, it may be measured through a self-diagnostic resistor of the PCSV, but, in the case of a stuck in an open or closed state, a complicated calculation should be performed.

Such a diagnosis on components of an evaporation system is performed by assuming that the fuel tank is sealed, but, when a leak occurs at the evaporation system, the evaporated HC gas is released into the atmosphere to inevitably exceed a regulation value with respect to the evaporated HC gas.

Also, since the canister collects only an appropriate amount of the evaporated HC gas, a precise canister purge should be performed through the PCSV.

FIG. 1 is a diagram schematically illustrating an evaporated gas leak monitoring system, and a PCSV diagnosis is performed during monitoring a leak of an evaporative sealing system.

Referring to FIG. 1, a canister is configured to collect evaporated HC gas which is generated in a fuel tank, and may include a canister closed valve (CCV) provided between the atmosphere and the canister and having a normal open structure, and, when whether a leak of the evaporative sealing system occurs is determined, the CCV is closed and a sealed state is then diagnosed.

Here, when the PCSV disposed at the intake system of the engine is open, the evaporated HC gas which is collected at the canister is recirculated by a negative pressure in the engine in the form of gas which is suctioned into the engine.

Furthermore, a tank pressure sensor FTPS is disposed as a detector configured to diagnose the evaporative sealing system.

FIG. 2 is a diagram illustrating an evaporated gas leak monitoring method. Looking at a diagnosis of a PCSV closed stuck with reference to FIG. 2, the diagnosis of the PCSV closed stuck is performed during monitoring a leak of an evaporation system, and the monitoring of the leak of the evaporation system is performed based on a slope of a natural evaporation pressure after a target negative pressure is forcibly formed in the fuel tank.

That is, as a leak size becomes larger, a slope being monitored is also larger such that the leak size is measured based on the monitored slope.

Here, a method for forming a negative pressure in the fuel tank utilizes the negative pressure of the engine, and, at the present point, when the CCV is closed and the PCSV is open, the negative pressure is formed in the fuel tank.

When the PCSV is closed stuck, this does not affect to the negative pressure in the engine such that the negative pressure in the fuel tank is not formed and also only a minor variation occurs at a pressure in the fuel tank.

When such a phenomenon occurs, an ECU determines as a PCSV closed stuck.

In the related art, foreign materials are generated at the PCSV in proportion to a traveling distance of a vehicle due to the characteristic of an internal combustion engine thereof and are accumulated through a chemical reaction by the internal combustion engine between carbon or a fuel component and a fuel hose, and the accumulated foreign materials are mixed with fuel to be produced in a form of fluid that has viscosity. These fluid components are hardened due to an icing during an overnight soak so that there occurs an occasion in which the PCSV is pressure-adhered not to be open even in the same duty (that is, the same purge amount) when operating.

However, when a temperature rises to melt such foreign materials having viscosity, the PCSV operates again normally and thus, when such a series of processes as described above is repeated, an engine warning lamp is finally turned on.

Actually, in the case that the engine warning lamp is turned on, replacement of the PCSV is frequently performed and costs are largely consumed due to such a failure diagnosis resulting from the PCSV stuck.

Further, when an external temperature is low, the foreign materials having viscosity also causes an icing problem so that the icing problem is becoming a big problem for a manufacturer.

When a duty amount of the PCSV is increased during forming the negative pressure in an engine, the viscosity of the foreign materials is overcome to form the negative pressure and to resolve the above-described problems, but, there is a limitation in increasing the duty amount.

A mixture flowing into the PCSV is a mixture in which fuel and air are mixed, and since prediction is very difficult in terms of a current engine control that precisely controls the fuel, when an excessive mixture flows into the PCSV to run the engine, safety problems including a start-off and the like, may be caused.

When such an excessive mixture flows into the PCSV, an oxygen molecule (O2) detector learns a fuel amount of the excessive mixture, but the above-described problems occur before the O2 detector learns the fuel amount.

The contents described in Description of Related Art are to help the understanding of the background of the present invention, and may include what is not previously known to those skilled in the art to which the present invention pertains.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for diagnosing a purge control solenoid valve (PCSV), configured for diagnosing a closed stuck state and a failure state of the PCSV to resolve a temporary closed stuck thereof so that safety problems including a start-off of the engine and the like, are prevented and also unnecessary maintenance and replacement are not required.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a method for diagnosing a purge control solenoid valve (PCSV) may include forming a negative pressure in a fuel tank, checking a pressure in the fuel tank and determining whether a target negative pressure is generated, suspecting a stuck of the PCSV that electrically controls an inflow amount of evaporated gas from the fuel tank to an intake system of an engine when the target negative pressure is determined not to be formed based on the result of the determining whether the target negative pressure is generated, and increasing a purge amount of the PCSV.

When the target negative pressure is determined to be formed based on the result of the determining whether the target negative pressure is generated, the PCVS may be diagnosed as normal.

The forming of the negative pressure in the fuel tank may block a canister closed valve provided at a canister that recirculates the evaporated gas of the fuel tank, and open the PCSV to form the negative pressure in the fuel tank.

The method may further include, after the purge amount is increased to a target purge amount by the increasing of the purge amount of the PCSV, determining whether the negative pressure is formed in the fuel tank.

When the target negative pressure is determined not to be formed after the increasing of the purge amount of the PCSV based on the result of the determining whether the negative pressure is formed in the fuel tank, the PCSV may be diagnosed as a closed stuck failure.

The target purge amount may increase a duty more than that prior to the increasing of the purge amount of the PCSV, and a reference value of the duty being increased may target a duty value configured for having a maximum electromotive force of a PCSV according to the characteristic thereof, and may be a value which is improved in a range of 25% to 35% based on the PCSV which is used in a diagnosis.

After the increasing of the purge amount of the PCSV, the PCSV may be closed.

The method may further include, after the increasing of the purge amount of the PCSV, stopping an operation of the PCSV when the target negative pressure is determined to be formed based on the result of the determining whether the negative pressure is formed in the fuel tank.

Before stopping the increasing of the purge amount of the PCSV, a flip-flop is applied to maintain the increased purge amount of the PCSV.

The purge amount of the PCSV may be increased according to a map of the increased purge amount, wherein the map of the increased purge amount may be set to a 2-dimensional map and a purge duty amount may be determined by the negative pressure in the engine and the characteristic of the PCSV.

An accumulated purge amount, which is configured to be diagnosed as a failure of the PCSV, may be reduced to 0.6 kilogram (kg)/hour (h) or less.

In accordance with various exemplary embodiments of the present invention, a method for diagnosing a PCSV may include opening the PCSV that electrically controls an inflow amount of evaporated gas from a fuel tank to an intake system of an engine, suspecting a closed stuck of the PCSV when a target negative pressure is determined not to be formed in the fuel tank, and increasing a purge time of the PCSV to diagnose the closed stuck of the PCSV.

When the target negative pressure is determined to be formed in the fuel tank after the increasing of the purge time of the PCSV, the PCSV may not be diagnosed as a closed stuck failure.

When the target negative pressure is determined to be formed in the fuel tank, increasing a purge amount of the PCSV is stopped.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
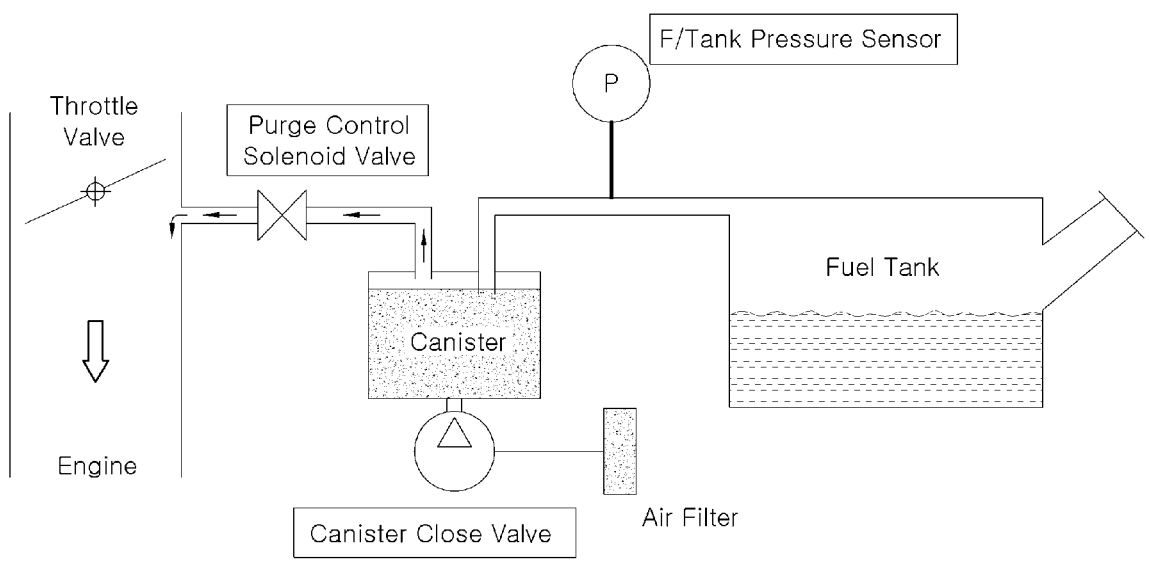
FIG. 1 is a diagram schematically illustrating an evaporated gas leak monitoring system.
Figure 2:
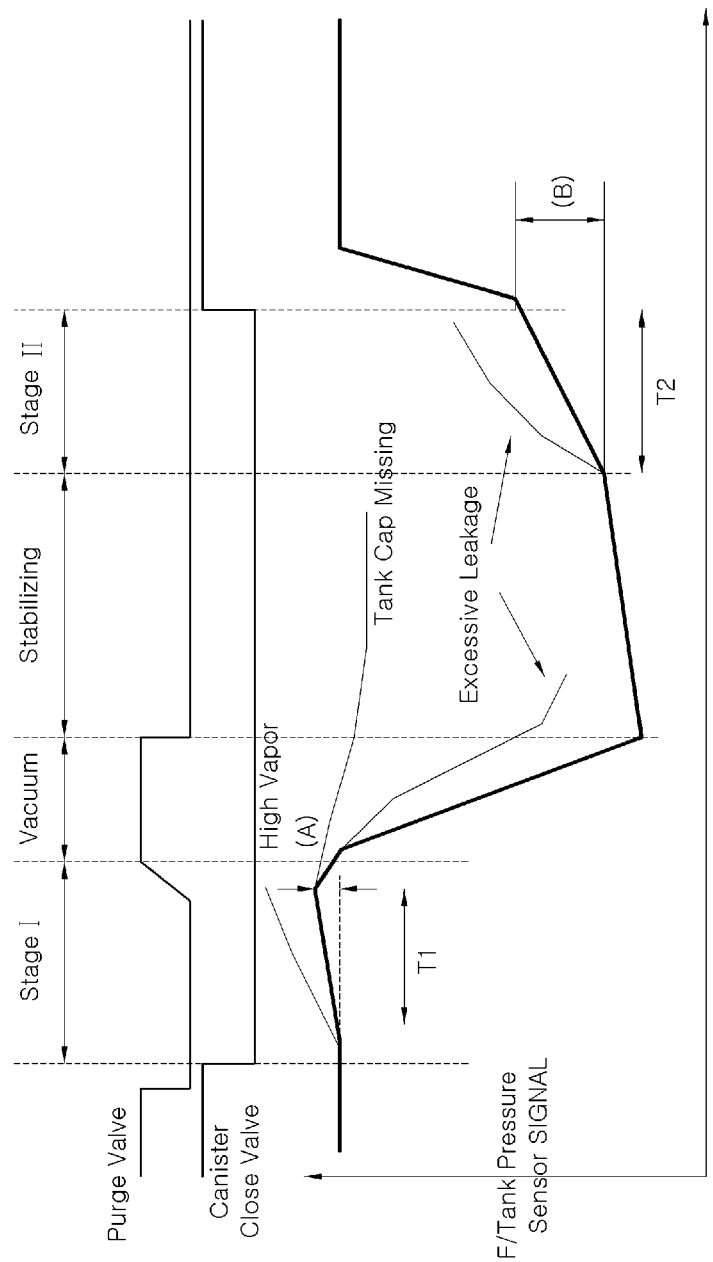
FIG. 2 is a diagram illustrating an evaporated gas leak monitoring method.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be the determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference may be made to the accompanying drawings that illustrate exemplary embodiments of the present invention, and to the description in the accompanying drawings to fully understand the present invention, operational advantages of the present invention, and objects attained by practicing the present invention.

In various exemplary embodiments, known technologies or detailed descriptions may be reduced or omitted to avoid obscuring appreciation of the disclosure by those skilled in the art.

Figure 3:
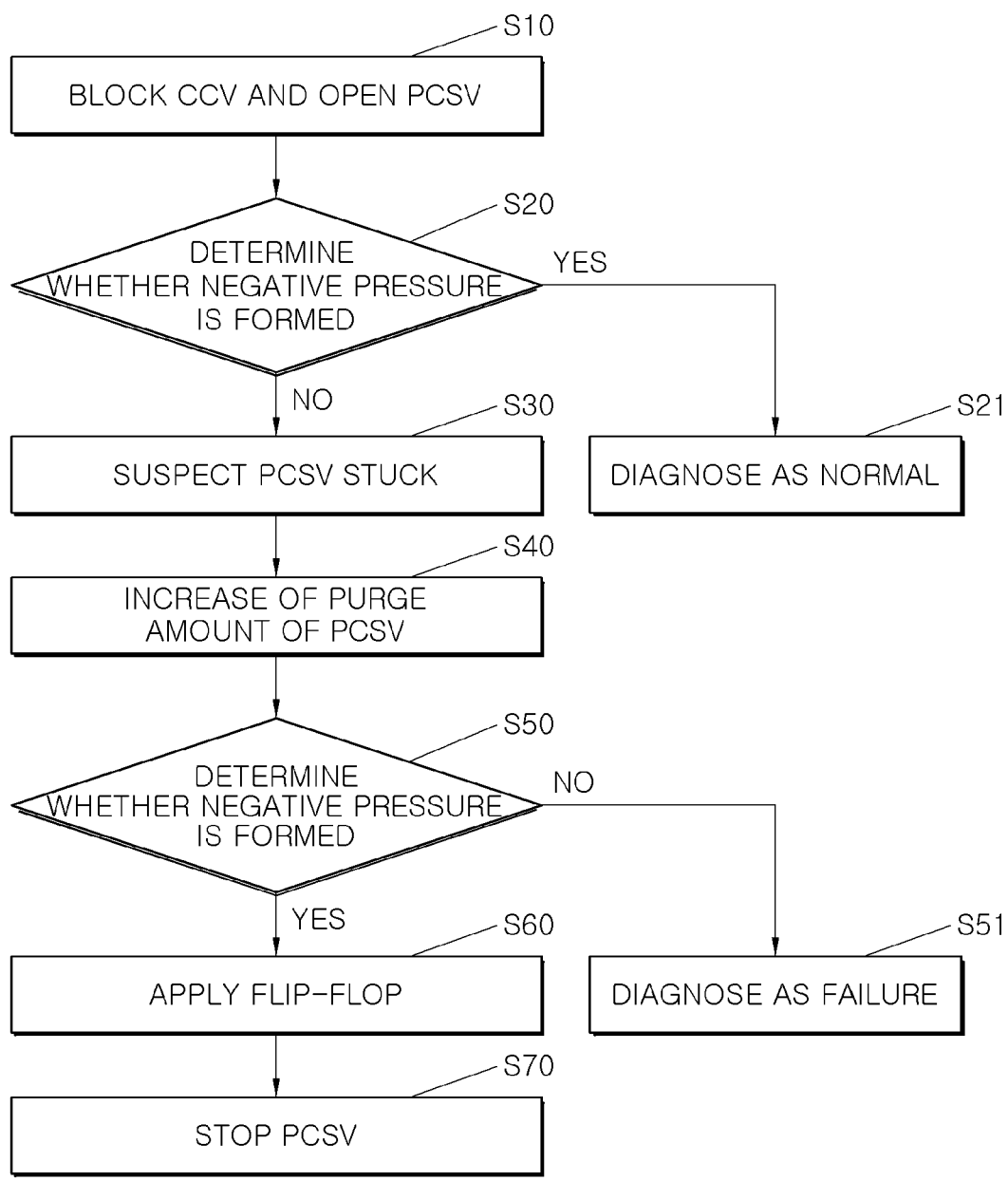
FIG. 3 is a diagram illustrating a purge control solenoid valve (PCSV) diagnosis method according to an exemplary embodiment of the present invention.
Figure 4:
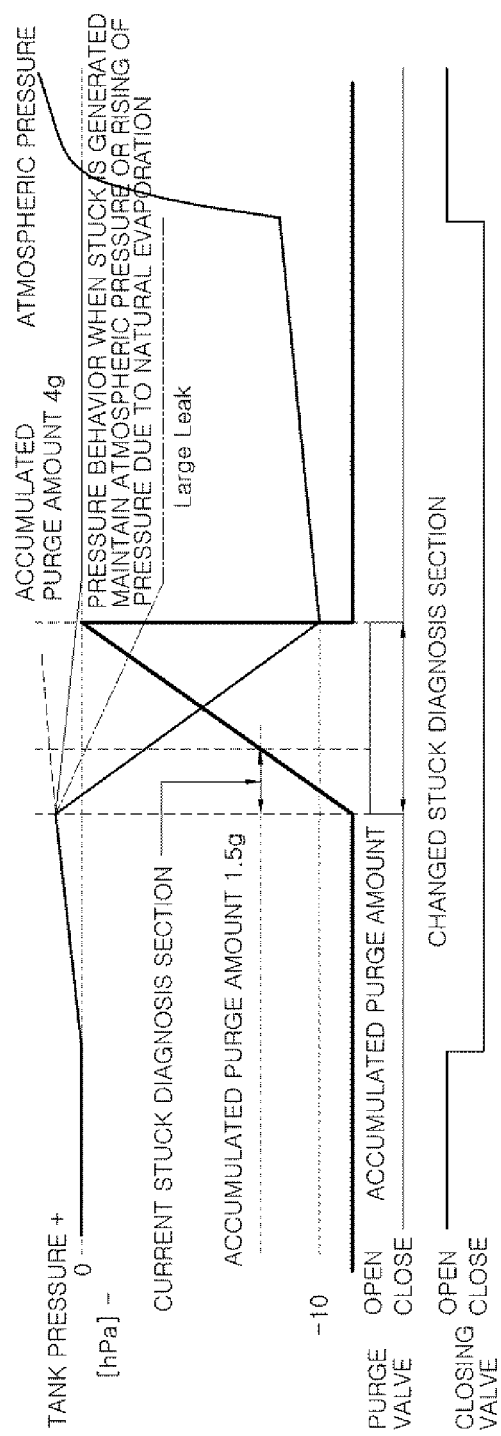
FIG. 4 is a diagram for describing the PCSV diagnosis method according to an exemplary embodiment of the present invention.

FIG. 3 is a diagram illustrating a purge control solenoid valve (PCSV) diagnosis method according to an exemplary embodiment of the present invention, and FIG. 4 is a diagram for describing the PCSV diagnosis method according to an exemplary embodiment of the present invention.

Hereinafter, the PCSV diagnosis method according to one exemplary embodiment of the present invention will be described with reference to FIG. 3 and FIG. 4.

As is described above, there is a limitation in increasing a duty amount and responding to a PCSV closed stuck to cause a result in which a time for a failure diagnosis is prolonged.

Consequently, as shown in FIG. 4, the present invention divides a PCSV diagnosis into two stages and additionally increases an accumulated air amount, and, when a PCSV closed stuck is suspected at a first stage, it increases a purge duty amount to determine whether the PCSV closed stuck is an actual stuck or a temporary stuck resulting from carbon deposition and the like.

First, a canister closed valve (CCV) is blocked and a PCSV is open (S10) to form a negative pressure in a fuel tank.

As such, whether a target negative pressure is formed in the fuel tank is determined through a tank pressure detector (S20).

When the target negative pressure is measured based on the determination result (S20), the PCSV may be diagnosed as normal (S21).

However, when a state of a pressure in the fuel tank is determined that the pressure in the fuel tank does not reach the target negative pressure and an atmospheric pressure or variation of the pressure is small based on the determination result (S20), the PCSV is suspected whether a restorable stuck state occurs instead of directly diagnosing the state as a PCSV stuck (S30).

In the typical diagnosing of the PCSV stuck, when the pressure in the fuel tank is similar to an atmospheric pressure at an initial stage of forming the target negative pressure as the PCSV begins to be open, this is diagnosed as the PCSV stuck.

Such a typical diagnosing is employed as a first stage diagnosis in an exemplary embodiment of the present invention so that, when the pressure in the fuel tank is similar to the atmospheric pressure and the negative pressure in the engine is not generated at the first stage diagnosis, a purge amount will be added to perform a failure diagnosis.

As illustrated in the drawing, a diagnosis section is enlarged to increase the purge amount to a target amount (S40), and, when a purge duty amount is increased, a duty that overcomes viscosity due to carbon is generated at some point. At this point, the PCSV is determined as normal.

That is, in a second stage diagnosis after the first stage diagnosis, a pressure behavior similar to the atmospheric pressure exhibits and a stuck is resolved at some point so that an abrupt pressure drop including a normal behavior is generated.

As is described above, whether the negative pressure is formed in the fuel tank is again determined after the purge amount is increased (S50), and, if the target negative pressure is determined not to be formed even when the purge amount is increased, the PCSV is diagnosed as a PCSV stuck failure (S51), while if the target negative pressure is determined to be formed after the purge amount is increased, the PCSV is determined as a temporary PCSV stuck.

Furthermore, when the increased purge amount reaches the target amount, the PCSV is closed, and, when the PCSV is closed, the pressure in the fuel tank gradually rises as illustrated in the drawing.

As is described above, in the case of increasing the purge amount, when the PCSV is in an actual closed stuck state, almost no mixture may flow in the engine even though the purge amount is increased, driving of the engine may not be affected, and an actual amount of the mixture flowing into the engine may be decreased compared to a PCSV which is not in the actual closed stuck due to narrowness of a flow path by foreign materials.

Also, once a duty overcoming certain viscosity is generated, and thereafter, an operation of the PCSV may normally form the negative pressure in the fuel tank.

Figure 5:
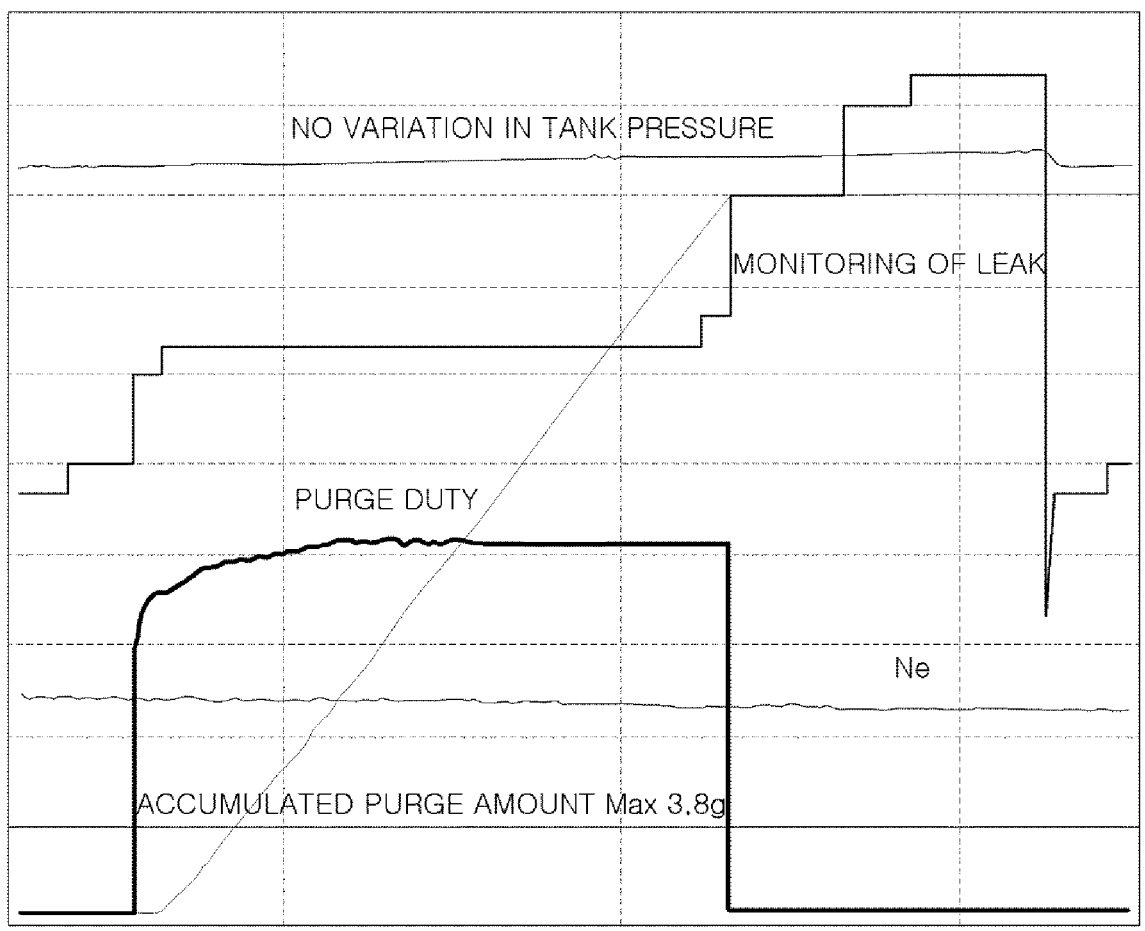
FIG. 5 is a diagram illustrating a monitoring result, to which the present invention is applied, with respect to a PCSV which is in a temporary stuck state.

FIG. 5 is a diagram illustrating a monitoring result with respect to a PCSV which is in a stuck state.

Referring to the drawing, the PCSV at which a field defect is generated does not actually operates, and FIG. 5 illustrates that a PCSV stuck is reproduced in a condition of an external temperature of 10° C. after an overnight soak.

Meanwhile, when the PCSV is determined as a temporary PCSV stuck due to the increased purge amount, the operation of the PCSV is stopped by reducing the increased purge amount again (S70), but, before reducing the increased purge amount, there is a need for applying a flip-flop (S60).

When the increased purge amount is immediately reduced during the previous increasing of the purge amount to form the pressure in the fuel tank as the negative pressure, a large leak error is generated so that the flip-flop may be set to maintain the increased purge amount.

Figure 6:
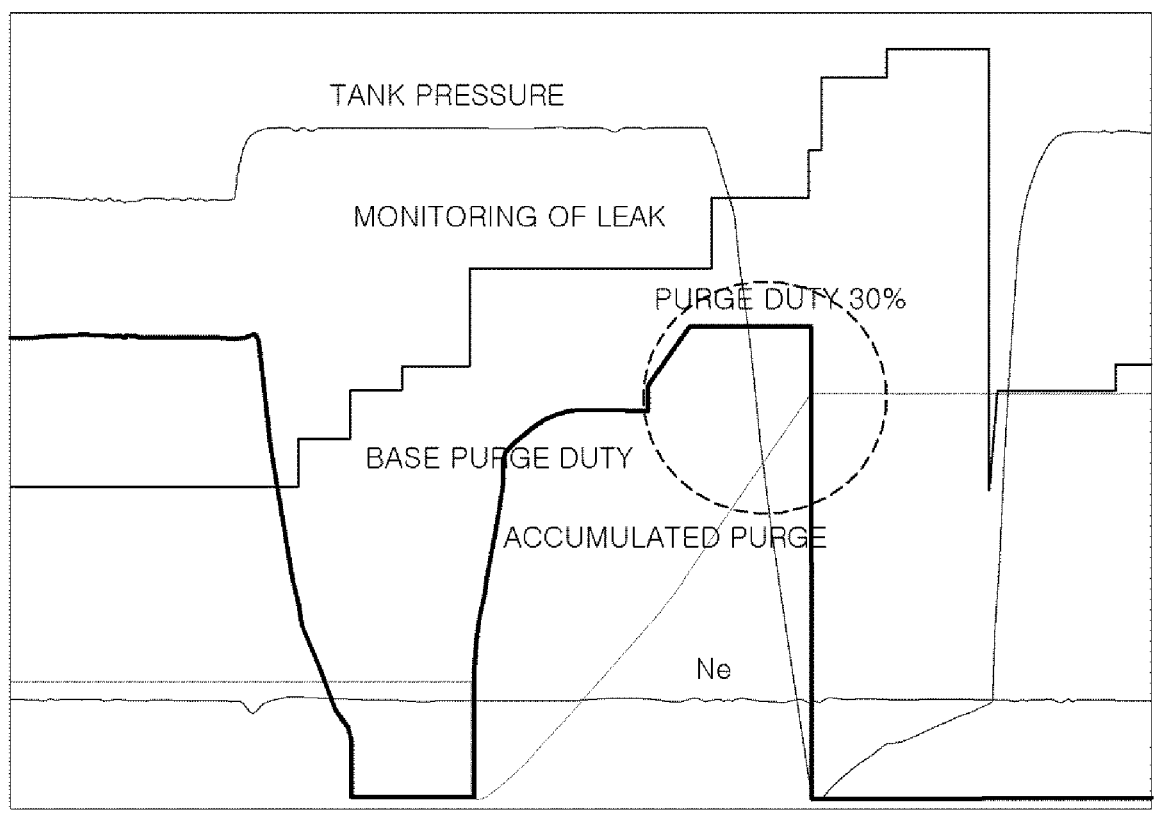
FIG. 6 is a diagram illustrating a monitoring result, to which the present invention is applied, with respect to a PCSV which is in a stuck state.

That is, as illustrated in FIG. 6, the above-described problems are resolved by maintaining the increased purge amount after increasing the purge amount until completing the diagnosis to attain the target purge amount which is a purge amount which is improved in a range of 25% to 35%, and, to avoid an abrupt increase of the purge amount to maintain an idle of the vehicle, a map of the increased purge amount is set to a two-dimensional map and is mapped according the negative pressure in the engine and the characteristic of the PCSV so as not to cause a problem in driving the engine.

Also, to secure a time for overcoming the stuck of the PCSV, a condition for an accumulated purge amount is more preferable to be reduced than a typical condition therefor.

Figure 7:
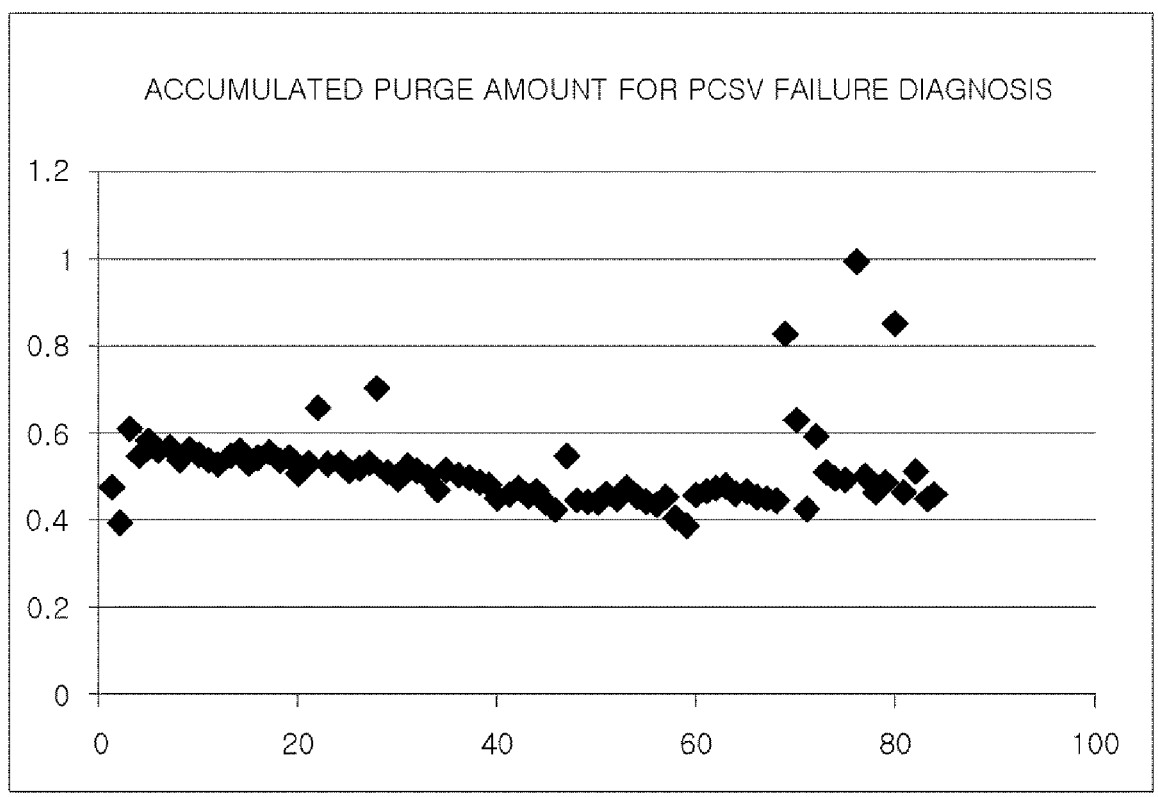
FIG. 7 is a diagram illustrating a leak monitoring result to which an applied embodiment of the present invention is applied.

That is, as reference to FIG. 7, when an accumulated purge amount is 0.6 kg/h based on a defect evaluation result, the pressure in the fuel tank reaches a failure diagnosis pressure so that an accumulated purge amount which is diagnosed as a failure is preferably reduced to 0.6 kg/h or less to enable the purge amount to be increased over the failure diagnosis pressure.

However, the accumulated purge amount may be different according to the vehicle and an engine displacement thereof so that it may be changeable in a form of a mapping parameter.

While the present invention has been described with respect to the specific embodiments, it will be apparent to those skilled in the art that various changes and modifications may be made without departing from the spirit and scope of the invention as defined in the following claims.

In accordance with exemplary embodiments of the present invention, it is possible to increase the purge amount of the PCSV by determining a state of the PCSV using the suspecting of the stuck of the PCSV to resolve the stuck of the PCSV instead of immediately diagnosing the PCSV as a PCSV stuck failure in the case that the pressure in the fuel tank is determined not to reach the target negative pressure based on the measurement result of the tank pressure detector when the PCSV is diagnosed.

Consequently, when the PCSV is in a temporary closed stuck state, the temporary closed stuck state is resolved by increasing the purge amount of the PCSV so that losses for a failure diagnosis and maintenance can be reduced.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for diagnosing a purge control solenoid valve (PCSV), the method comprising:
    forming a negative pressure in a fuel tank;
    checking a pressure in the fuel tank and determining whether a target negative pressure is generated;
    when the target negative pressure is determined not to be formed based on a result of the determining whether the target negative pressure is generated, suspecting a stuck of the PCSV that electrically controls an inflow amount of evaporated gas from the fuel tank to an intake system of an engine;
    increasing a purge amount of the PCSV;
    after the purge amount is increased to a target purge amount by the increasing of the purge amount of the PCSV, determining whether the target negative pressure is formed in the fuel tank; and
    when the target negative pressure is determined to be formed by the increasing of the purge amount of the PCSV based on the result of the determining whether the target negative pressure is formed in the fuel tank, stopping the increasing of the purge amount of the PCSV,
    wherein, when the target negative pressure is determined not to be formed after the increasing of the purge amount of the PCSV based on the result of the determining whether the target negative pressure is formed in the fuel tank, the PCSV is diagnosed as a closed stuck failure.

2. The method of claim 1, wherein, when the target negative pressure is determined to be formed based on the result of the determining whether the target negative pressure is generated, the PCVS is diagnosed as normal.

3. The method of claim 2, wherein the forming of the negative pressure in the fuel tank blocks a canister closed valve provided at a canister that recirculates the evaporated gas of the fuel tank, and opens the PCSV to form the negative pressure in the fuel tank.

4. The method of claim 1, wherein the target purge amount has a value which is improved in a range of 25% to 35% more than that prior to the increasing of the purge amount of the PCSV.

5. The method of claim 4, wherein, after the increasing of the purge amount of the PCSV, the PCSV valve is closed.

6. The method of claim 1, wherein, before the stopping of the increasing of the purge amount of the PCSV, a flip-flop is applied to maintain the increased purge amount of the PCSV.

7. The method of claim 1, wherein the purge amount of the PCSV is increased according to a map of the increased purge amount, and wherein the map of the increased purge amount is set to a 2-dimensional map.

8. The method of claim 7, wherein an accumulated purge amount, which is configured to be diagnosed as a failure of the PCSV, is reduced to 0.6 kilogram (kg)/hour (h) or less.

* * * * *